(12) United States Patent
Keller et al.

(10) Patent No.: US 8,696,861 B2
(45) Date of Patent: Apr. 15, 2014

(54) GRINDABLE SILICONE ELASTOMER COMPOSITION AND THE USE THEREOF

(75) Inventors: Wolfgang Keller, Burghausen (DE); Werner Brennenstuhl, Burgkirchen (DE); Andreas Köllnberger, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/822,532

(22) PCT Filed: Sep. 27, 2011

(86) PCT No.: PCT/EP2011/066783
§ 371 (c)(1),
(2), (4) Date: Apr. 9, 2013

(87) PCT Pub. No.: WO2012/049020
PCT Pub. Date: Apr. 19, 2012

(65) Prior Publication Data
US 2013/0186564 A1 Jul. 25, 2013

(30) Foreign Application Priority Data
Oct. 12, 2010 (DE) .......................... 10 2010 042 352

(51) Int. Cl.
C09J 183/06 (2006.01)

(52) U.S. Cl.
USPC ........................................................ 156/329

(58) Field of Classification Search
USPC ........................................................ 156/329
See application file for complete search history.

(56) References Cited

U.S. PATENT DOCUMENTS

| 6,451,870 | B1 * | 9/2002 | DeCato et al. ................. 522/99 |
| 2007/0060717 | A1 * | 3/2007 | Zech et al. .................... 525/478 |
| 2010/0183814 | A1 | 7/2010 | Rios et al. |

FOREIGN PATENT DOCUMENTS

EP 1 475 069 A1 11/2004

* cited by examiner

Primary Examiner — Michael Orlando
Assistant Examiner — Daniel Lee
(74) Attorney, Agent, or Firm — Brooks Kushman P.C.

(57) ABSTRACT

Temporary adhesive compositions used to adhesively bond a substrate to be abraded or polished onto a substrate are themselves abradable or polishable, and contain a non-reinforcing filler or particulate silicone resin in a curable organopolysiloxane composition, and have defined physical characteristics in addition to being thermally stable.

9 Claims, No Drawings

GRINDABLE SILICONE ELASTOMER COMPOSITION AND THE USE THEREOF

CROSS-REFERENCE TO RELATED APPLICATIONS

This application is the U.S. national phase of PCT Appln. No. PCT/EP2011/066783 filed Sep. 27, 2011 which claims priority to German application 10 2010 042 352.1 filed Oct. 12, 2010, the disclosures of which are incorporated in their entirety by reference herein.

BACKGROUND OF THE INVENTION

1. Field of the Invention

The present invention relates to a product formulation based on silicone elastomer compositions for the temporary adhesive bonding of a workpiece, intended to be sanded or polished, to a support substrate, the silicone elastomer composition being sandable or polishable after curing.

2. Description of the Related Art

For a sanding operation, workpieces must be mechanically fastened. In the case of high-price workpieces such as gemstones, optical lenses, art objects or semiconductor wafers, for example, such fastening frequently causes damage to the workpiece, or the fixing does not exhibit the desired stability. There is therefore a need for alternative methods of fixing. One possibility is to fasten the workpiece using a temporary adhesive bond. Since, during the operation of sanding or polishing, an unavoidable possibility is that the sanding device may come into contact with the adhesive as well, the adhesive as well must be sandable, since otherwise, for example, materials would fracture, or the sanding apparatus will be soiled or damaged. In addition, a good temperature stability at up to more than 300° C. is necessary, in order to withstand the friction, and hence increase in temperature, caused by the sanding or polishing. Temperature stability is necessary, moreover, since downstream processing steps on the workpiece may take place within a high temperature range. Chemical stability as well is an important property for an adhesive of this kind, such as stability toward cleaning chemicals, for example.

Furthermore, minimal release of volatile by-products, and the viscosity of the noncrosslinked silicone elastomer composition, are important in order to minimize, for example, the risk of contamination and hazard to health, and to allow suitable application to the workpiece. Furthermore, it must be possible, after sanding or polishing, for the adhesive to be removable from the workpiece easily and as far as possible without residue.

SUMMARY OF THE INVENTION

It was an object of the present invention, therefore, to provide a suitable adhesive for the fastening of workpieces, adhesive being, after curing, sandable or polishable, temperature-stable, chemically-stable, and easy to apply, and being removable from the workpiece again without problems, without damage or soiling of the workpiece or of the sanding or polishing apparatus. These and other objects have been achieved by means of the crosslinkable silicone elastomer compositions of the invention, comprising (E) 35-80% by weight of at least one compound selected from the group containing nonreinforcing fillers, branched silicone resins or mixtures thereof.

DETAILED DESCRIPTION OF THE PREFERRED EMBODIMENTS

After the silicone elastomer compositions of the invention have been crosslinked, the crosslinked silicone rubber exhibits a Shore A hardness according to DIN 53505 of between 30 and 95, the tear propagation resistance according to ASTM D624-B-91 of not more than 4 N/mm, preferably not more than 3N/mm, the elongation at break according to DIN 53504-85S1 of not more than 150%, preferably not more than 100%, and the tensile strength according to DIN 53504-85S1 of not more than 3 N/mm$^2$, preferably not more than 2 N/mm$^2$.

Nonreinforcing fillers (E) are those fillers which do not substantially improve the mechanical strength, such as tear propagation resistance, elongation at break, and tensile strength of the crosslinked silicone rubber. Essential to the invention in this case is that the non-reinforcing fillers are present in the silicone elastomer compositions in an amount such that in the crosslinked silicone rubber they produce the mechanical strength values that are stated above, which for silicone rubbers are unusually poor.

Silicone elastomer compositions of the invention may be condensation-crosslinking, addition-crosslinking or peroxide-crosslinking compositions, which are known in the state of the art. Preferably they are addition-crosslinking silicone elastomer compositions.

Addition-crosslinking silicone elastomer compositions comprise besides (E)

(A) 20-60% by weight of linear compounds containing radicals having aliphatic carbon-carbon multiple bonds, preferably 35-50% by weight (B) 1-10% by weight of linear organopolysiloxanes having Si-bonded hydrogen atoms, preferably 2-8% by weight or instead of (A) and (B)

(C) 30-60% by weight of linear organopolysiloxanes containing SiC-bonded radicals having aliphatic carbon-carbon multiple bonds and Si-bonded hydrogen atoms, preferably 40-55% by weight of (C), and (D) at least one hydrosilylation catalyst.

The silicone rubber of the invention is produced by crosslinking the silicone elastomer compositions of the invention.

Advantages of the silicone elastomer compositions of the invention are that on account of the Shore A hardness (DIN 53505) of between 30 and 95, preferably 40 and 80, and of the combination of the mechanical values stated above, the compositions are sandable and/or polishable after the composition has cured, and hence the workpiece does not fracture or become damaged. Furthermore, the compositions can be applied by conventional industrial techniques (for example, spray-coating, printing, dipping, spin-coating), and can be parted from the workpiece without residue at the desired point in time, using appropriate techniques.

Moreover, the compositions exhibit approximately Newtonian flow behavior with low shear thinning (no gel state at zero shear), in order to ensure the application of a uniform film thickness over the planned temporary bond area. The silicone elastomer compositions of the invention have a ratio of the dynamic viscosity at the shear rates of 1 s$^{-1}$ and 100 s$^{-1}$ at room temperature of not more than 3, preferably not more than 2, and more preferably not more than 1.2. The dynamic viscosity at room temperature and at a shear rate of 1 s$^{-1}$ of the noncrosslinked silicone elastomer compositions of the invention amounts to between 10 and 20,000 mPa·s, preferably between 50 and 10,000 mPa·s.

Moreover, the compositions show very low fractions of volatile constituents, in order to prevent instances of contamination and blistering in the course of machining. Here, the difference in mass of the cured silicone rubber in thermogravimetric analysis (TGA), with a heating rate of 10 K/min to 300° C. and with an air or nitrogen flow of 30 ml/min between room temperature and 300° C. is not more than 2% by weight, preferably not more than 1% by weight, and more preferably not more than 0.5% by weight. Moreover, the compositions exhibit low rates of subsequent formation of volatile constituents.

The crosslinked silicone elastomer compositions have a high temperature stability, >250° C. over several hours and up to >300° in the case of peaks.

The crosslinkable silicone elastomer compositions of the invention have the advantage that they can be prepared in a simple process using readily available starting materials and hence economically. The crosslinkable compositions of the invention have the further advantage that as a one-component formulation at 25° C. and ambient pressure they exhibit high storage stability and crosslink rapidly only at elevated temperature. The silicone compositions of the invention have the advantage that, in the case of two-component formulations, after the two components have been mixed, a crosslinkable silicone composition is produced whose processing properties are attained over a long period at 25° C. and ambient pressure, in other words exhibiting exceptionally long pot life, and undergoing rapid crosslinking only at elevated temperature.

The compositions of the invention may be one-component silicone compositions or else two-component silicone compositions. In the latter case, the two components of the compositions of the invention may comprise all of the constituents in any desired combination, generally with the proviso that one component does not simultaneously contain siloxanes with aliphatic multiple bond, siloxanes with Si-bonded hydrogen, and catalyst—in other words, essentially, not simultaneously the constituents (A), (B), and (D), or (C) and (D). Preferably, however, the compositions of the invention are one-component compositions. The one-component silicone elastomer compositions of the invention are prepared by mixing all of the constituents in accordance with the prior art.

The compounds (A) and (B), or (C), used in the addition-crosslinking compositions of the invention are selected, as is known, in such a way that crosslinking is possible. Thus, for example, compound (A) may have at least two aliphatically unsaturated radicals and (B) has at least three Si-bonded hydrogen atoms, or compound (A) may have at least three aliphatically unsaturated radicals and siloxane (B) has at least two Si-bonded hydrogen atoms, or else, instead of compound (A) and (B), siloxane (C) is used, which contains aliphatically unsaturated radicals and Si-bonded hydrogen atoms in the proportions specified above. Also possible are mixtures of (A) and (B) and (C) with the above-specified proportions of aliphatically unsaturated radicals and Si-bonded hydrogen atoms.

The compound (A) used in accordance with the invention may comprise silicon-free organic compounds having preferably at least two aliphatically unsaturated groups, or linear organosilicon compounds having preferably at least two aliphatically unsaturated groups, or else mixtures thereof.

Examples of silicon-free organic compounds (A) are 1,3,5-trivinylcyclohexane, 2,3-dimethyl-1,3-butadiene, 7-methyl-3-methylene-1,6-octadiene, 2-methyl-1,3-butadiene, 1,5-hexadiene, 1,7-octadiene, 4,7-methylene-4,7,8,9-tetrahydroindene, methylcyclopentadiene, 5-vinyl-2-norbornene, bicyclo[2.2.1]hepta-2,5-diene, 1,3-diisopropenyl-benzene, vinyl-group-containing polybutadiene, 1,4-divinylcyclohexane, 1,3,5-triallylbenzene, 1,3,5-trivinylbenzene, 1,2,4-trivinylcyclohexane, 1,3,5-triisopropenylbenzene, 1,4-divinylbenzene, 3-methylhepta-1,5-diene, 3-phenylhexa-1,5-diene, 3-vinylhexa-1,5-diene, and 4,5-dimethyl-4,5-diethylocta-1,7-diene, N,N'-methylenebisacrylamide, 1,1,1-tris(hydroxymethyl)propane triacrylate, 1,1,1-tris(hydroxymethyl)propane trimethacrylate, tripropylene glycol diacrylate, diallyl ether, diallylamine, diallyl carbonate, N,N'-diallylurea, triallylamine, tris(2-methylallyl)amine, 2,4,6-triallyloxy-1,3,5-triazine, triallyl-s-triazine-2,4,6(1H,3H,5H)-trione, diallyl malonic acid ester, polyethylene glycol diacrylate, polyethylene glycol dimethacrylate, and poly(propylene glycol) methacrylate.

The silicone compositions of the invention preferably comprise as constituent (A) at least one aliphatically unsaturated, linear organosilicon compound, it being possible to use all aliphatically unsaturated linear organosilicon compounds which are useful in addition-crosslinking compositions, for example, silicone block copolymers with urea segments, silicone block copolymers with amide segments and/or imide segments and/or ester-amide segments and/or polystyrene segments and/or silarylene segments and/or carborane segments, and silicone graft copolymers with ether groups.

Used with preference as organosilicon compounds (A) containing SiC-bonded radicals having aliphatic carbon-carbon multiple bonds are linear organopolysiloxanes composed of units of the general formula (II)

$$R_a R^1_b SiO_{(4-a-b)/2} \quad \text{(II)}$$

where
- R independently of one another, are organic or inorganic radicals free from aliphatic carbon-carbon multiple bonds,
- $R^1$ independently of one another, are monovalent, substituted or unsubstituted, SiC-bonded hydrocarbon radicals having at least one aliphatic carbon-carbon multiple bond,
- a is 1, 2 or 3, and
- b is 1 or 2, with the proviso that the sum a+b is less than or equal to 3 and there are at least 2 radicals $R^1$ per molecule.

Radical R may comprise monovalent or polyvalent radicals, in which case the polyvalent radicals, such as divalent, trivalent and tetravalent radicals, for example, join together two or more, such as two, three or four, for instance, siloxy units of the formula (II).

Further examples of R are the monovalent radicals —F, —Cl, —Br, $OR^2$, —CN, —SCN, —NCO, and SiC-bonded, substituted or unsubstituted hydrocarbon radicals which may be interrupted by oxygen atoms or by the group —C(O)—, and also divalent radicals Si-bonded on both sides in accordance with formula (II). Where radical R comprises SiC-bonded, substituted hydrocarbon radicals, preferred substituents are halogen atoms, phosphorus-containing radicals, cyano radicals, —$OR^2$, —$NR^2$—, —$NR^2_2$, —$NR^2$—C(O)—$NR^2_2$, —C(O)—$NR^2_2$, —C(O) $R^2$, —C(O)$OR^2$, —$SO_2$-Ph, and —$C_6F_5$. $R^2$ here, independently of one another, denotes a hydrogen atom or a monovalent hydrocarbon radical having 1 to 20 carbon atoms, and Ph is the phenyl radical.

Examples of radical R are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl, and methylcyclohexyl radicals; aryl radicals such as the phenyl, naphthyl, anthryl, and phenanthryl radical, alkaryl radicals such as o-, m-, p-tolyl radicals, xylyl radicals, and ethylphenyl radicals; and aralkyl radicals such as the benzyl radical and the α- and the β-phenylethyl radicals.

Examples of substituted radicals R are haloalkyl radicals such as the 3,3,3-trifluoro-n-propyl radical, the 2,2,2,2',2',2'-hexafluoroisopropyl radical, the heptafluoro-isopropyl radical; haloaryl radicals such as the o-, m- and p-chlorophenyl radicals, —$(CH_2)$—$N(R^2)C(O)NR^2{}_2$, —$(CH_2)_n$—$C(O)$ $NR^2{}_2$, —$(CH_2)_n$—$C(O)$ $R^2$, —$(CH_2)_n$—$C(O)$ $OR^2$, —$(CH_2)_n$—$C(O)$ $NR^2{}_2$, —$(CH_2)$—$C(O)$—$(CH_2)_mC(O)$ $CH_3$, —$(CH_2)$—O—CO—$R^2$, —$(CH_2)$—$NR^2$—$(CH_2)_m$ $NR^2{}_2$, —$(CH_2)_n$—O—$(CH_2)_m$CH(OH) $CH_2OH$, —$(CH_2)_n$ $(OCH_2CH_2)_mOR^2$, —$(CH_2)_n$—$SO_2$-Ph, and —$(CH_2)_n$—O—$C_6F_5$, where $R^2$ and Ph have the definitions indicated for them above, and n and m denote identical or different integers between 0 and 10.

Examples of R as divalent radicals Si-bonded on both sides in accordance with formula (II) are those which derive from the above monovalent examples stated for radical R in an additional bond through substitution of a hydrogen atom; examples of radicals of this kind are —$(CH_2)$—, —CH$(CH_3)$—, —$C(CH_3)_2$—, —CH$(CH_3)$—$CH_2$—, —$C_6H_4$—, —CH(Ph)—$CH_2$—, —$C(CF_3)_2$—, —$(CH_2)_n$—$C_6H_4$— $(CH_2)_n$—, —$(CH_2)_n$—$C_6H_4$—$C_6H_4$—$(CH_2)_n$—, —$(CH_2O)_m$, $(CH_2CH_2O)_m$, —$(CH_2)_n$—$O_x$—$C_6H_4$—$SO_2$—$C_6H_4$—$O_x$—$(CH_2)_n$—, where x is 0 or 1, and Ph, m, and n have the definitions stated above.

Radical R preferably comprises a monovalent, SiC-bonded, optionally substituted hydrocarbon radical having 1 to 18 carbon atoms which is free from aliphatic carbon-carbon multiple bonds, more preferably a monovalent, SiC-bonded hydrocarbon radical having 1 to 6 carbon atoms which is free from aliphatic carbon-carbon multiple bonds, and more preferably the methyl or phenyl radical.

Radical $R^1$ may be any desired group amenable to an addition reaction (hydrosilylation) with an SiH-functional compound. If radical $R^1$ comprises SiC-bonded, substituted hydrocarbon radicals, preferred substituents are halogen atoms, cyano radicals, and —$OR^2$, where $R^2$ has the definition stated above.

Radical $R^1$ preferably comprises alkenyl and alkynyl groups having 2 to 16 carbon atoms, such as vinyl, allyl, methallyl, 1-propenyl, 5-hexenyl, ethynyl, butadienyl, hexadienyl, cyclopentenyl, cyclopentadienyl, cyclohexenyl, vinylcyclohexylethyl, divinylcyclohexylethyl, norbornenyl, vinylphenyl, and styryl radicals, with vinyl, allyl, and hexenyl radicals being used with particular preference.

The molecular weight of constituent (A) may vary within wide limits, for instance between $10^2$ and $10^6$ g/mol. Hence the constituent (A) may be, for example, an alkenyl-functional oligosiloxane of relatively low molecular weight, such as 1,2-divinyltetramethyldisiloxane, or alternatively may be a high-polymer polydimethylsiloxane possessing in-chain or terminal Si-bonded vinyl groups, having a molecular weight, for example, of $10^5$ g/mol (numerical average determined by means of NMR).

As organosilicon compound (B) it is possible to use all hydrogen-functional organosilicon compounds which have also been employed to date in addition-crosslinkable compositions.

As organopolysiloxanes (B) containing Si-bonded hydrogen atoms it is preferred to use linear organopolysiloxanes composed of units of the general formula (III)

$R_cH_dSiO_{(4-c-d)/2}$ (III)

where
R has the definition indicated above,
c is 0, 1, 2 or 3, and
d is 0, 1 or 2,
with the proviso that the sum of c+d is less than or equal to 3, and there are at least two Si-bonded hydrogen atoms per molecule.

The organopolysiloxane (B) used in accordance with the invention preferably contains Si-bonded hydrogen in the range from 0.04 to 1.7 percent by weight, based on the total weight of the organopolysiloxane (B).

The molecular weight of the constituent (B) may likewise vary within wide limits, for instance between $10^2$ and $10^6$ g/mol. Thus, for example, the constituent (B) may be an SiH-functional oligosiloxane of relatively low molecular weight, such as tetramethyldisiloxane, or alternatively may be a high-polymer polydimethylsiloxane possessing SiH groups in-chain or terminally, or a silicone resin containing SiH groups.

The structure of the molecules that form constituent (B) is also not fixed; in particular, the structure of an SiH-containing siloxane which is of relatively high molecular weight, i.e. oligomeric or polymeric, may be linear. Linear polysiloxanes (B) are preferably composed of units of the formula $R_3SiO_{1/2}$, $HR_2SiO_{1/2}$, $HRSiO_{2/2}$, and $R_2SiO_{2/2}$, with R having the definition indicated above.

Of course, it is also possible to use mixtures of different siloxanes satisfying the criteria for constituent (B). More particularly, the molecules which form the constituent (B) may, in addition to the obligatory SiH groups, optionally also comprise aliphatically unsaturated groups as well. Particularly preferred is the use of low-molecular-weight, SiH-functional compounds such as tetrakis(dimethylsiloxy)silane and tetramethylcyclotetrasiloxane, and also relatively high-molecular-weight, SiH-containing siloxanes, such as poly(hydrogenmethyl)siloxane and poly(dimethyl-hydrogenmethyl)siloxane having a viscosity at 25° C. of 10 to 10,000 mPa·s, or analogous SiH-containing compounds in which some of the methyl groups have been replaced by 3,3,3-trifluoropropyl or phenyl groups.

Constituent (B) is preferably present in the crosslinkable silicone compositions of the invention in an amount such that the molar ratio of SiH groups to aliphatically unsaturated groups (A) is 0.1 to 20, more preferably between 1.0 and 5.0.

The components (A) and (B) used in accordance with the invention are commercial products and/or can be prepared by methods which are commonplace in chemistry.

Instead of component (A) and (B), the silicone compositions of the invention may comprise linear organopolysiloxanes (C) which simultaneously contain aliphatic carbon-carbon multiple bonds and Si-bonded hydrogen atoms. The silicone compositions of the invention may also comprise all three components (A), (B), and (C).

If siloxanes (C) are used, they are preferably siloxanes composed of units of the general formulae (IV), (V), and (VI)

$R_fSiO_{4/2}$ (IV)

$R_gR^1SiO_{3-g/2}$ (V)

$R_hHSiO_{3-h/2}$ (VI)

where
R and $R^1$ have the definition indicated for them above,
f is 1, 2 or 3,
g is 1 or 2, and
h is 1 or 2,
with the proviso that per molecule there are at least 2 radicals $R^1$ and at least 2 Si-bonded hydrogen atoms.

The organopolysiloxanes (C) preferably possess an average viscosity of 0.01 to 500,000 Pa·s, more preferably 0.1 to 100,000 Pa·s, in each case at 25° C.

Organopolysiloxanes (C) are preparable by methods which are commonplace in chemistry.

As the hydrosilylation catalyst (D) it is possible to use all of the components known to the state of the art. Component (D) may be a platinum-group metal, for example platinum, rhodium, ruthenium, palladium, osmium or iridium, an organometallic compound, or a combination thereof. Examples of component (D) are compounds such as hexachloroplatinic (IV) acid, platinum dichloride, platinum acetylacetonate, and complexes of these compounds which are encapsulated in a matrix or in a structure of core-shell type. The platinum complexes with low molecular weight organopolysiloxanes include 1,3-diethenyl-1,1,3,3-tetramethyldisiloxane complexes with platinum. Further examples are platinum-phosphite complexes, platinum-phosphine complexes or alkyl-platinum complexes. These compounds may be encapsulated in a resin matrix.

The concentration of component (D) is sufficient to catalyze the hydrosilylation reaction of components (A) and (B) on exposure, in order to generate the heat required here in the process described. The amount of component (D) may be between 0.1 and 1000 parts per million (ppm), 0.5 and 100 ppm or 1 and 25 ppm of the platinum-group metal, depending on the total weight of the components. The curing rate may be low if the constituent of the platinum-group metal is below 1 ppm. The use of more than 100 ppm of the platinum-group metal is uneconomic or may reduce the stability of the composition.

Constituent (E) is selected from the group containing nonreinforcing fillers such as calcium carbonate, iron oxide, aluminum oxide, hydrated aluminum oxide, titanium dioxide, silicious earth, quartz, calcium sulfate and the like, branched silicone resins or mixtures thereof.

Where (E) comprises nonreinforcing fillers, aluminum oxide is preferred.

The particle sizes of the nonreinforcing fillers (E) are smaller than 100 μm, preferably smaller than 80 μm, more preferably smaller than 60 μm.

As constituent (E), the silicone compositions of the invention preferably comprise branched silicone resins, comprising units of the general formulae (VII), (VIII), and (IX)

$$R_n SiO_{4/2} \quad (VII)$$

$$R_k R^1_l SiO_{(4-k-l)/2} \quad (VIII)$$

$$R_o HSiO_{3-o/2} \quad (IX)$$

where
R and $R^1$ independently of one another carry the definition stated above,
n is 0, 1, 2 or 3,
k is 0, 1 or 2,
l is 0, 1 or 2, and
o is 0, 1 or 2,
with the proviso that there is at least one T or Q unit present per molecule.

The structure of the molecules that form constituent (E) is also not fixed; in particular, the structure of a relatively high-molecular-weight—that is oligomeric or polymeric—siloxane may be branched or else resinlike, networklike. Branched and networklike polysiloxanes additionally comprise trifunctional and/or tetrafunctional units, where those of the formulae $HSiO_{3/2}$, $RSiO_{3/2}$, $R^1 SiO_{3/2}$, and $SiO_{4/2}$ are preferred, and R and $R^1$ have the above definitions. Of course, it is also possible to use mixtures of different silicone resins satisfying the criteria for constituent (E).

The silicone elastomer compositions of the invention may optionally comprise all further additives which are useful for preparing addition-crosslinkable compositions. Examples of reinforcing fillers (F) which may be used as a component in the silicone compositions of the invention are fumed or precipitated silicas having BET surface areas of at least 50 m²/g, and also carbon blacks and activated carbons, such as furnace black and acetylene black, with preference being given to fumed and precipitated silicas having BET surface areas of at least 50 m²/g. The silica fillers may be hydrophilic in character or may have been hydrophobized by known methods. If hydrophilic fillers are incorporated, the addition of a hydrophobizing agent is necessary. The amount of actively reinforcing filler in the crosslinkable composition of the invention is in the range from 0% to 70% by weight, preferably 0% to 50% by weight.

The silicone elastomer compositions of the invention may optionally comprise, as constituents, further additives (G) in a fraction of up to 70% by weight, preferably 0.0001% to 40% by weight. These additives may be fungicides, fragrances, rheological additives, corrosion inhibitors, oxidation inhibitors, light stabilizers, flame retardants, and agents for influencing the electrical properties, dispersing assistants, solvents, adhesion promoters, pigments, dyes, plasticizers, organic polymers, heat stabilizers, etc. They include additives such as clays, lithopones, carbon blacks, graphite, metal oxides, metal carbonates, metal sulfates, metal salts of carboxylic acids, metal dusts, fibers, such as glass fibers, plastics fibers, plastics powders, metal dusts, dyes, pigments, etc.

These fillers, moreover, may be heat-conducting or electrically conducting. Examples of heat-conducting fillers are aluminum nitride; barium titanate; beryllium oxide; boron nitride; diamond; graphite; magnesium oxide; particulate metals such as copper, gold, nickel or silver; silicon carbide, tungsten carbide, zinc oxide, and combinations thereof. Heat-conducting fillers are known in the prior art and are available commercially. A combination of fillers with different particle sizes and a different particle-size distribution can be used.

The silicone elastomer composition of the invention may optionally comprise solvents (H) in addition. It must be ensured, however, that the solvent has no adverse effects on the system as a whole. Suitable solvents are known in the prior art and are available commercially. The solvent may be, for example, an organic solvent having 3 to 20 carbon atoms. The examples of solvents include aliphatic hydrocarbons such as nonane, decalin, and dodecane; aromatic hydrocarbons such as mesitylene, xylene, and toluene; esters such as ethyl acetate and butyrolactone; ethers such as n-butyl ether and polyethylene glycol monomethyl ether; ketones such as methyl isobutyl ketone and methyl pentyl ketone; silicone fluids such as linear, branched, and cyclic polydimethylsiloxanes, and combinations of these solvents. The optimum concentration of a particular solvent in the silicone elastomer composition of the invention may be determined easily by means of routine experiments. Depending on the weight of the compound, the amount of the solvent may be between 0% and 95% or between 1% and 95%.

As further optional components (K) it is possible to add inhibitors and stabilizers. These additives serve for the specific establishment of processing life, onset temperature, and crosslinking rate of the silicone compositions of the invention. These inhibitors and stabilizers are very well known in the field of addition-crosslinking compositions. Examples of customary inhibitors are acetylenic alcohols, such as 1-ethynyl-1-cyclohexanol, 2-methyl-3-butyn-2-ol, and 3,5-dimethyl-1-hexyn-3-ol, 3-methyl-1-dodecyn-3-ol, polymethylvinylcyclosiloxanes such as 1,3,5,7-tetravinyltetramethyltetracyclosiloxane, low molecular weight silicone oils with methylvinyl-$SiO_{1/2}$ groups and/or $R_2$vinyl$SiO_{1/2}$ end groups, such as divinyltetramethydisiloxane, tetravinyldimethyldisiloxane, trialkyl cyanurates, alkyl maleates, such as diallyl maleates, dimethyl maleate, and diethyl maleate, alkyl fumarates, such as diallyl fumarate and diethyl fumarate, organic hydroperoxides such as cumene hydroperoxide, tert-butyl hydroperoxide, and pinane hydroperoxide, organic peroxides, organic sulfoxides, organic amines, diamines and amides, phosphates and phosphites, nitriles, triazoles, diaziridines, and oximes. The effect of these inhibitor additives (K) is dependent on their chemical structure, and so the concentration must be ascertained individually. Inhibitors and inhibitor mixtures are added preferably in a proportion of 0.00001% to 5%, based on the total weight of the mixture, preferably 0.00005 to 2%, and more preferably 0.0001% to 1%.

EXAMPLES

In the examples described below, all indications of parts and percentages, unless indicated otherwise, are by weight. Unless indicated otherwise, the examples below are carried out at a pressure of the surrounding atmosphere, in other words approximately at 1000 hPa, and at room temperature, in other words at approximately 20° C., or at a temperature which comes about when the reactants are combined at room temperature without additional heating or cooling. In the text below, all viscosity figures relate to the dynamic viscosity at a temperature of 20° C. and a shear rate of $1\ s^{-1}$. The examples below illustrate the invention, without having any restrictive effect. All examples show the overall composition of the crosslinked products; whether they are formulated as one- or two-component compositions has no part to play in this context.

Abbreviations Used are as Follows:
Cat. platinum catalyst
Ex. inventive example
CEx. comparative example
No. number
PDMS polydimethylsiloxane
% by weight corresponds to percent by weight
Shore A hardness to DIN 53505
TPR tear propagation resistance according to ASTM D624-B-94 in N/mm
EB elongation at break according to DIN 53504-85S1 in %
TS tensile strength according to DIN 53504-85S1 in $N/mm^2$ In the examples below, the platinum catalyst used was a platinum-divinyltetramethyldisiloxane complex (Karstedt catalyst).

In the examples below, the SiH comb crosslinkers have dynamic viscosities of 30 to 400 mPa·s.

Example 1

Silicone Elastomer Composition 1

22% by weight of a vinyl-terminated linear PDMS having a viscosity of 200 mPa·s
20% by weight of a vinyl-terminated linear PDMS having a viscosity of 20 000 mPa·s
54% by weight of a spherical aluminum oxide having a maximum particle size of 80 μm
4% by weight of a linear SiH comb crosslinker having a hydrogen content of 0.17% by weight
100 ppm of 1-ethynylcyclohexanol
10 ppm of platinum catalyst, based on the metal Example 2

Silicone Elastomer Composition 2

34% by weight of a vinyl-terminated linear PDMS having a viscosity of 200 mPa·s
60% by weight of an MQ resin containing vinyl groups
6% by weight of a linear SiH comb crosslinker having a hydrogen content of 0.5% by weight
200 ppm of 1-ethynylcyclohexanol
10 ppm of platinum catalyst, based on the metal Example 3

Silicone Elastomer Composition 3

30% by weight of a vinyl-terminated linear PDMS having a viscosity of 200 mPa·s
65% by weight of a vinyl-functional MQ resin
5% by weight of a linear SiH comb crosslinker having a hydrogen content of 0.7% by weight
100 ppm of 1-ethynylcyclohexanol
10 ppm of platinum catalyst, based on the metal Example 4

Silicone Elastomer Composition 4

45% by weight of a vinyl-terminated linear PDMS having a viscosity of 1000 mPa·s
50% by weight of a non-functional MQ resin
5% by weight of a linear SiH comb crosslinker having a hydrogen content of 0.35% by weight
100 ppm of 1-ethynylcyclohexanol
10 ppm of platinum catalyst, based on the metal Example 5

Silicone Elastomer Composition 5

45% by weight of a vinyl-terminated linear PDMS having a viscosity of 200 mPa·s
55% by weight of a calcium carbonate having a maximum particle size of 50 μm
4% by weight of a linear SiH comb crosslinker having a hydrogen content of 0.35% by weight
100 ppm of 1-ethynylcyclohexanol
10 ppm of platinum catalyst, based on the metal Example 6

Silicone Elastomer Composition 6

41% by weight of a vinyl-terminated linear PDMS having a viscosity of 200 mPa·s
58% by weight of a titanium dioxide having a maximum particle size of 100 μm
1% by weight of a peroxidic crosslinker Example 7

Silicone Elastomer Composition 7

41% by weight of an OH-terminated linear PDMS having a viscosity of 1000 mPa·s
55% by weight of an aluminum oxide having a maximum particle size of 80 μm
4% by weight of an alkoxysilane crosslinker
500 ppm of condensation catalyst Comparative Example 8

Silicone Elastomer Composition 8

76% by weight of a vinyl-terminated linear PDMS having a viscosity of 1000 mPa·s
20% by weight of a fumed silica having a BET surface area of 200 m²/g
4% by weight of a linear SiH comb crosslinker having a hydrogen content of 0.35% by weight
200 ppm of 1-ethynylcyclohexanol
10 ppm of platinum catalyst, based on the metal Table 1 lists the results of the measurements relating to the mechanical strength of the crosslinked silicone rubbers. The crosslinked silicone rubbers from example 1 to 7 were sandable, whereas comparative example 8 was not sandable.

TABLE 1

|  | Shore A | TPR | EB | TS | inventive |
|---|---|---|---|---|---|
| Ex. 1 | 35 | 2.4 | 90 | 0.6 | yes |
| Ex. 2 | 65 | 2.2 | 56 | 1.8 | yes |
| Ex. 3 | 80 | 1.5 | 40 | 1.4 | yes |
| Ex. 4 | 45 | 2.8 | 130 | 2.2 | yes |
| Ex. 5 | 55 | 2.0 | 90 | 1.9 | yes |
| Ex. 6 | 60 | 1.3 | 70 | 2.5 | yes |
| Ex. 7 | 40 | 1.2 | 110 | 2.0 | yes |
| CEx. 8 | 30 | 5.2 | 300 | 4.3 | no |

The invention claimed is:

1. A process for adhesively fastening and finishing workpieces, comprising:
    a) applying a crosslinkable silicone-elastomer adhesive to at least one workpiece to be fastened;
    b) contacting the workpieces such that the crosslinkable silicone elastomer adhesive is between surfaces of the workpiece to be fastened;
    c) curing the crosslinkable silicone elastomer adhesive, wherein the adhesive, following curing, has a ratio of dynamic viscosities at the shear rates of $1\ s^{-1}$ and $100\ s^{-1}$ at room temperature of not more than 1.2, the crosslinked silicone rubber has a Shore A hardness according to DIN 53505 of between 30 and 95, a tear propagation resistance according to ASTM D624-B-91 of not more than 4 N/mm, an elongation at break according to DIN 53504-85S1 of not more than 150%, and a tensile strength according to DIN 53504-85S1 of not more than 3 N/mm² to form fastened workpieces; and
    d) sanding and/or polishing at least a surface of the fastened workpieces having exposed cured adhesive,
    e) parting adhesive from the fastened workpieces.

2. The process of claim 1, wherein the crosslinkable silicone elastomer composition is an addition-crosslinking composition.

3. The process of claim 2, wherein besides (E) the addition-crosslinking silicone elastomer composition comprises the following components
    (A) 20-60% by weight of linear compound(s) containing radicals having aliphatic carbon-carbon multiple bonds,
    (B) 1-10% by weight of linear organopolysiloxanes having Si-bonded hydrogen atoms
or instead of (A) and (B)
    (C) 30-60% by weight of linear organopolysiloxane(s) containing SiC-bonded radicals having aliphatic carbon-carbon multiple bonds and Si-bonded hydrogen atoms, and
    (D) at least one hydrosilylation catalyst.

4. The process of claim 1, wherein the crosslinkable silicone elastomer composition is a condensation-crosslinking composition.

5. The process of claim 1, wherein the crosslinkable silicone elastomer composition is a peroxide-crosslinking composition.

6. The process of claim 1, wherein the cured adhesive has a Shore A hardness between 40 and 80.

7. The process of claim 1, wherein the crosslinkable silicone elastomer adhesive contains a non-reinforcing filler.

8. The process of claim 7, wherein the reinforcing filler comprises aluminum oxide.

9. The process of claim 1, wherein the crosslinkable silicone elastomer adhesive contains a branched silicone resin.

* * * * *